United States Patent
Stluka et al.

(10) Patent No.: US 10,459,412 B2
(45) Date of Patent: Oct. 29, 2019

(54) CONVERGENCE STRUCTURE FOR CONTROL AND DATA ANALYTICS SYSTEMS

(71) Applicant: Ademco Inc., Golden Valley, MN (US)

(72) Inventors: Petr Stluka, Prague (CZ); Aravind Padmanabhan, Plymouth, MN (US); Vladimir Havlena, Prague (CZ)

(73) Assignee: Ademco Inc., Golden Valley, MN (US)

( * ) Notice: Subject to any disclaimer, the term of this patent is extended or adjusted under 35 U.S.C. 154(b) by 0 days.

(21) Appl. No.: 15/717,532

(22) Filed: Sep. 27, 2017

(65) Prior Publication Data

US 2019/0094821 A1 Mar. 28, 2019

(51) Int. Cl.
*G05B 13/04* (2006.01)

(52) U.S. Cl.
CPC .................... *G05B 13/041* (2013.01)

(58) Field of Classification Search
CPC .................................................. G05B 13/041
See application file for complete search history.

(56) References Cited

U.S. PATENT DOCUMENTS

| | | | |
|---|---|---|---|
| 8,743,765 B2 | 6/2014 | Kakani et al. | |
| 8,755,848 B2 | 6/2014 | Jain et al. | |
| 2005/0254444 A1 | 11/2005 | Meier et al. | |
| 2007/0251461 A1* | 11/2007 | Reichard | A01K 63/006 119/245 |
| 2010/0070089 A1* | 3/2010 | Harrod | G05B 19/042 700/277 |
| 2011/0202185 A1* | 8/2011 | Imes | G05B 15/02 15/2 |
| 2012/0232701 A1* | 9/2012 | Carty | G05B 15/02 15/2 |
| 2013/0151012 A1* | 6/2013 | Shetty | G05D 23/1923 700/276 |

(Continued)

FOREIGN PATENT DOCUMENTS

| | | |
|---|---|---|
| EP | 1571760 A1 | 9/2005 |
| EP | 2157739 A1 | 2/2010 |
| WO | 2016145418 A1 | 9/2016 |

OTHER PUBLICATIONS

The International Preliminary Report and Written Opinion for PCT Application No. PCT/US2016/022218, dated Sep. 12, 2017.

(Continued)

*Primary Examiner* — Vincent H Tran
(74) *Attorney, Agent, or Firm* — Shumaker & Sieffert, P.A.

(57) ABSTRACT

A structure having convergence of a control system and a data analytics system. The control system may involve input-output models of items, for example, homes, buildings and process plants. The system may use sensor data and scientific principles to implement control models. The models may help to precisely achieve a desired value of a parameter. The data analytics system may involve analysis of diverse data and may create insights of the items. The control system plus the data analytics system may close the loop between insights and on-premise controls of the items represented by the input-output models. The control and data analytics systems may merge the best of both worlds to solve difficult issues pertaining to the items. The structure may be for comfort control, energy reduction, and so on, having improved performance based on the convergence.

6 Claims, 11 Drawing Sheets

(56) References Cited

U.S. PATENT DOCUMENTS

| | | | | |
|---|---|---|---|---|
| 2013/0238144 A1* | 9/2013 | Shahapurkar | ...... | G05D 23/1923 |
| | | | | 700/278 |
| 2013/0274940 A1* | 10/2013 | Wei | ........................ | G05B 19/02 |
| | | | | 700/291 |
| 2014/0365017 A1* | 12/2014 | Hanna | ...................... | F24F 11/30 |
| | | | | 700/276 |
| 2015/0170090 A1* | 6/2015 | Bose | ................ | G06Q 10/06395 |
| | | | | 705/7.41 |
| 2015/0178865 A1* | 6/2015 | Anderson | .............. | G05B 17/02 |
| | | | | 705/7.25 |
| 2016/0370771 A1* | 12/2016 | Torres Fuchslocher | ...................... | |
| | | | | G06Q 50/06 |
| 2017/0235857 A1* | 8/2017 | Haye | ................... | G06F 17/5009 |
| | | | | 703/7 |
| 2017/0314800 A1* | 11/2017 | Bengea | .................. | G05B 13/04 |
| 2018/0196402 A1* | 7/2018 | Glaser | .................. | G05B 19/048 |

OTHER PUBLICATIONS

Knoll "5 Great Battery Saving Apps to Extend Your Android Phone's Life," downloaded from http://trendblog.net/5-great-battery-saving-apps-for-android-phones-to-extend-your-android-phone-life/, Sep. 2, 2013, printed Mar. 18, 2015.

* cited by examiner

CONVERGENCE STRUCTURE FOR CONTROL AND DATA ANALYTICS SYSTEMS

BACKGROUND

The present disclosure pertains to systems for managing and analyzing data.

SUMMARY

The disclosure reveals a system for convergence of control systems and data analytics systems. Control system may involve input-output or state-space models of items, processes, devices, pieces of equipment that are automatically controlled, for example, in homes, buildings and process plants. The system may use sensor data and scientific principles to implement and apply models for prediction, control and optimization. The models may help to precisely achieve a desired value of a controlled variable.

Data analytics may involve analysis of diverse data and may create insights related to the operation performance of the controlled items, processes, devices, or pieces of equipment. For instance, an insight could be identification of specific hardware faults that cause operational inefficiencies and create risks that control system will not necessarily be able to deliver the desired control function. The converged system may close the loop between such insights and on-premise controls of the items represented by the control models. Control and data analytics systems or modules may merge their functions and capabilities to solve difficult issues pertaining to items and optimize their operation. The system may be for comfort control, energy reduction, and so on, having improved performance based on the convergence of control systems and data analytics, machine learning, and so forth.

DESCRIPTION

Figure 1:
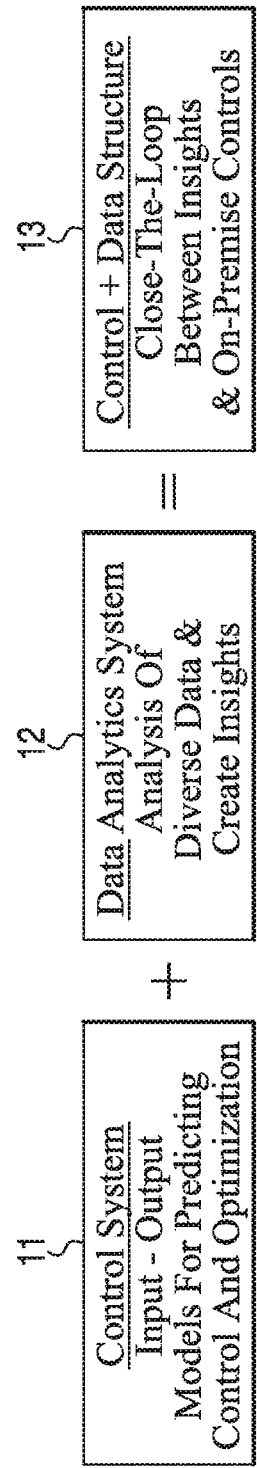
FIG. 1 is a diagram of an outline of a control system and data analytics system convergence.

The present system and approach may incorporate one or more processors, computers, controllers, user interfaces, wireless and/or wire connections, and/or the like, in an implementation described and/or shown herein.

This description may provide one or more illustrative and specific examples or ways of implementing the present system and approach. There may be numerous other examples or ways of implementing the system and approach.

Aspects of the system or approach may be described in terms of symbols in the drawing. Symbols may have virtually any shape (e.g., a block) and may designate hardware, objects, components, modules, systems, activities, states, steps, procedures, and other items.

Businesses may deliver closed-loop feedback control systems to manage comfort conditions in residential and commercial buildings, and optimize operation of heating, ventilation and air-conditioning equipment (HVAC) so that it runs at minimum cost. The value delivered by control systems can be significantly increased by implementing cloud-based data analytics system that will process data from potentially large numbers of connected devices and generate new information that will be supplied to the control system to optimize its performance as well as performance of assets that are controlled. Analytics may be the discovery, interpretation, and communication of meaningful patterns in data.

The present disclosure may provide a generic IoT architecture and a work process for implementation of data analytics whose outputs are translated directly into set-point or schedule adjustments and/or other actions that can be applied automatically within a closed-loop control system.

The present system may incorporate: 1) Deployment of a physical control system with control logic embedded in local controllers and with all relevant devices (sensors, actuators, meters, and so forth) provided with the possibility to expose its data to data analytics; 2) Edge-to-cloud gateway and data transfer; 3) Deployment of cloud-based data storage and an analytic infrastructure that will allow one to run both streaming and batch analytical jobs (the term "analytic" may cover also system identification, optimization, and so forth, and one may be talk about cloud services covering analytics, optimization, and so on, as depicted in FIGS. 7-11); 4) Cloud-to-edge communication of the analytic results, translated into specific control actions, including: a) set-point adjustment, b) schedule adjustment, c) control parameter adjustment, d) adjustment of weights in multi-objective optimizations, such as comfort and cost, and e) selection of devices to form a group to be controlled in the same way (like in DR applications); and 5) Adjustment of the embedded control logic based on the information received from cloud analytics.

A company may be uniquely positioned to benefit from a coupling of control systems with data analytics. Unlike other companies, the present company may not only "own" the physical control layer but also implement efficient data analytics in the cloud whose functions will complement physical controls. The present automated adjustments of the control system by the results of cloud analytics may enable a step change in the performance (cost savings, quality of control, and so on) without a need to install additional hardware.

Multiple applications may be enabled by the present system that will be best made using an IoT architecture.

The main categories of new applications may be noted in the following. Analytics may be used to model and predict variables that are difficult to measure. This "inferential sensing" approach may help to improve closed loop control by estimation of unmeasured disturbance variables, states, or other parameters. For instance, an estimated occupancy may improve HVAC control, estimated commute patterns of people may help to adjust thermostat schedule, and a learned set of preferred HVAC settings may help to optimize comfort.

There may be monitoring of the system or process that is being controlled (e.g., all HVAC equipment, boilers, chillers, air handlers, and so forth) to detect faults and deviations from normal behavior. This information may help to reconfigure the control system automatically to minimize the impact of any fault and achieve a form of fault tolerant control.

Optimal control settings may be learned by analyzing data from a fleet of the same or similar connected devices, such as heat pumps or air-conditioning equipment. This approach may help to tune controller parameters with respect to a local climate, a daily regime, or other influencing factors.

There may be learning of important characteristics of multiple distributed systems, such as thermal dynamic characteristics of individual houses that are controlled by connected thermostats. This may help determine optimal control groups for Demand Response (DR) events and enable utilities to execute a DR event according to a specification, e.g., reaching certain number of nega-watts in certain period of time, where the nega-watts represent an amount of electrical power saved The present system may have a software component delivering insights (analytics) such as for data manipulation to gain information (e.g., trend and predictive analytics tool).

Convergence between a control system and a data analytics system may occur. The control system may involve input-output or state space models of, for example, homes, buildings and process plants. It may use sensor data and physics/chemistry principles to implement control models. The models may help to precisely achieve a desired value of a controlled variable (e.g., temperature, pressure, flow) compensating for disturbances. Besides data analysis, the role of the edge data processing may be also extraction of relevant information to be sent to the cloud from time-triggered data streams (preprocessing/aggregation of raw data). The control system may consistently deliver reliable performance without unintended consequences. (See item 11 of FIG. 1.)

The data analytics system may involve analysis of diverse data and may create insights of, for example, homes, buildings and process plants, and so on. The data analytics system may use large volumes and varieties of data from multiple sources (owned and/or third party) to deliver insights. Insights help to understand the inner nature of operating various objects in homes, buildings, or process plants. For instance, by analyzing HVAC data from a commercial building, an analytic algorithm can assess performance levels and efficiencies of individual roof-top units. It may be used to analyze data simultaneously from hundreds of homes, buildings and process plants. A quality of an insight may depend on data quality (measurement errors, outliers, missing data points, and so on) and could be imprecise for situations unseen before. (See item 12 of FIG. 1.)

Control and data analytics systems may close the loop between insights and on premise controls of, for example, homes, buildings, process plants, and so forth. The closing of the loop means to transfer the new information (insights) automatically to the control system, which will receive it and adjust itself accordingly. (It may be noted that some disturbances cannot necessarily be fully compensated, depending on a particular system structure.) In this way, control plus data analytics systems may merge their functions and capabilities to solve unique customer issues. The present approach may use insights from hundreds of homes, buildings and process plants to close the loop and to create value individually and system-wide. Control algorithms may ensure that data analytics insights are integrated with high reliability to deliver sustainable performance. The present entity may be uniquely positioned to exploit this convergence to create value and improvement of comfort control, energy reduction, and so on. (See item 13 of FIG. 1.)

A use case may be a connected home. There may be controls plus data analytics applications delivering thermal comfort in a home. The data analytics system may analyze consumer commute behavior and traffic patterns to estimate a time of arrival. This information will be communicated to the connected thermostat to activate respective air-conditioning at the right time. The consumer may benefit by a reduced number of arrivals to discomfort via an optimized thermostat schedule. (See FIG. 2.)

Another application may be a guarantee of "fleet-wide" energy reduction. A value may be to analyze air-conditioning and its runtime data to characterize the thermal dynamics of individual homes in given city or state, for demand response events and control actions that can be taken by the utilities.

Another application may be a home insulation scorecard. A value may be to analyze home temperatures, weather, air conditioning (A/C), and A/C runtime data to make a non-intrusive or remote assessment of home insulation, for establishing optimal schedules and setbacks to be used by the control algorithm of a connected thermostat.

Another application may be optimal performance of heating and cooling equipment. A value may be to analyze boiler or A/C data to detect faults and performance issues, and adjusting heating and cooling controls to minimize the impact. There may be a notification to a third party service company to fix the problem. These applications may in summary be used to analyze consumer/HVAC/insulation to guarantee optimal performance and comfort.

Another use case may be a connected building. Here, there also may be controls plus data analytics applications. One application may be to optimize comfort for building occupants. A value may be to collect and analyze feedback from occupants, and weather and HVAC data to model a relation between comfort and costs. Percentage of dissatisfied occupants may be minimized based on this analysis. There may be a clear handle to manage the cost-comfort balance always resulting into a set of specific set-points for the control system Another application may be predictive maintenance of HVAC equipment. A value may be to analyze a time series of sensors and meter data to detect degradation trends. There may be automatic, real-time fault finding and fixing. It may involve planning of the right maintenance at the right time. Adjusting control may stabilize equipment conditions in the time before next maintenance.

Another application may be an ongoing commissioning. A value may be to analyze sensor and meter data do detect inadequate performance or other anomalies. There may be an identification of energy waste and inefficient operation. This may enable fine-tuning models and an overall control strategy.

Another application may involve campus and enterprise-wide optimization. A value may be to analyze detailed data from multiple buildings to predictively and optimally dispatch energy flows (e.g., hot water, chilled water, and conditioned air). There may be reduced energy and operational costs across the enterprise. This may result in performance scorecards that provide opportunities to optimize across the fleet. This combination may permit one to analyze weather, sensor readings and meters to solve operating issues and predict failures.

FIG. 1 is a diagram of a conveyance of the control system and data analytics system. Block 11 represents a control system with input-output or state space models of such things as homes, buildings and process plants; the models may be for prediction, control and optimization. Block 12 represents a data analytics system incorporating analysis of diverse data and creating insights relating to the homes, buildings and process plants. A summing and conveyance of both systems may be represented by block 13, which may close a loop between insights and on-premise controls for the homes, buildings and process plants.

Figure 2:
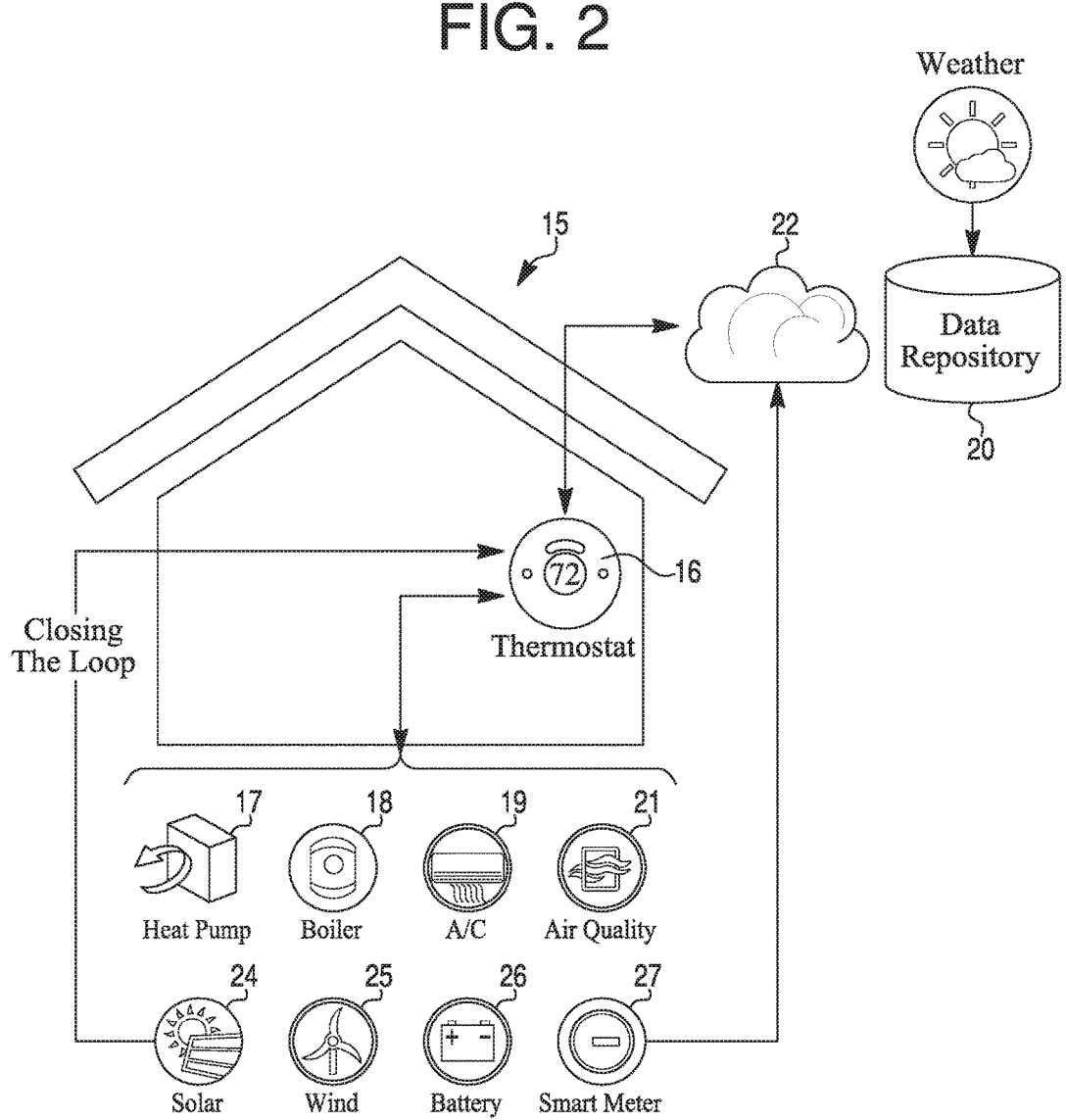
FIG. 2 and FIG. 3 are diagrams of controls and analytics applications for use cases of a connected home and building.

FIG. 2 is a diagram of a connected home 15 which may be a use case for controls and data analytics applications. A thermostat 16 may be focal points of the noted applications. A two-way connection may between thermostat 16 and, for instance, a heat pump 17, boiler 18, A/C 19 and air quality system 21. Thermostat 16 may have a two-way connection with a cloud 22. Cloud 22 may have data repository 20 of weather information for the local area of home 15. A solar energy source 24, wind energy source 25, a battery 21, and a smart meter 27 may be connected to cloud 22. To close a loop with thermostat 16, solar energy source 24, wind energy source 25, battery 26 and smart meter 27 may be also connected to thermostat 16.

Figure 3:
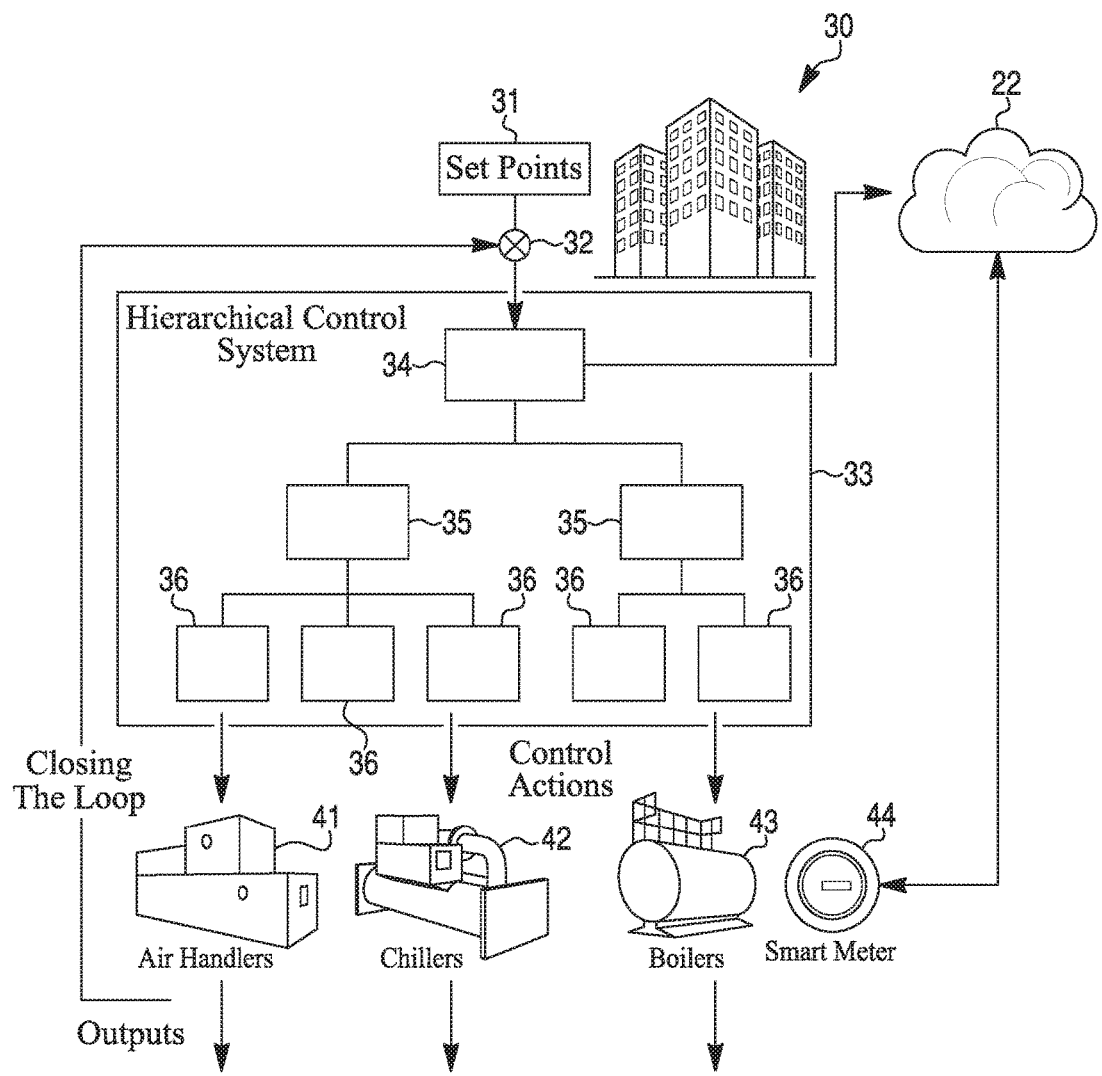

FIG. 3 is a diagram of a connected building 30, which may be a use case for controls and data analytics applications. There may be set points 31 that have an output connected to a summer 32. An output from summer 32 may go to a hierarchical control system 33 having a first level component 34 (such as a supervisory controller), second level components 35 (such as plant controllers) and third level components 36 (such as unitary controllers). There may be more or less levels, and more or less components for each level.

Control actions may be output from components 36 to equipment such as air handlers 41, chillers 42, boilers 43 and smart meter 44. Smart meter 44 may have a two-way connection with cloud 22. Also, hierarchical control system may have a two-way connection with cloud 22. Outputs of air handlers 41, chillers 42, and boilers 43 may have outputs that may be connected to summer 32 to close a control loop. An output of meter 44 may also be connected to summer 32.

Figure 4:
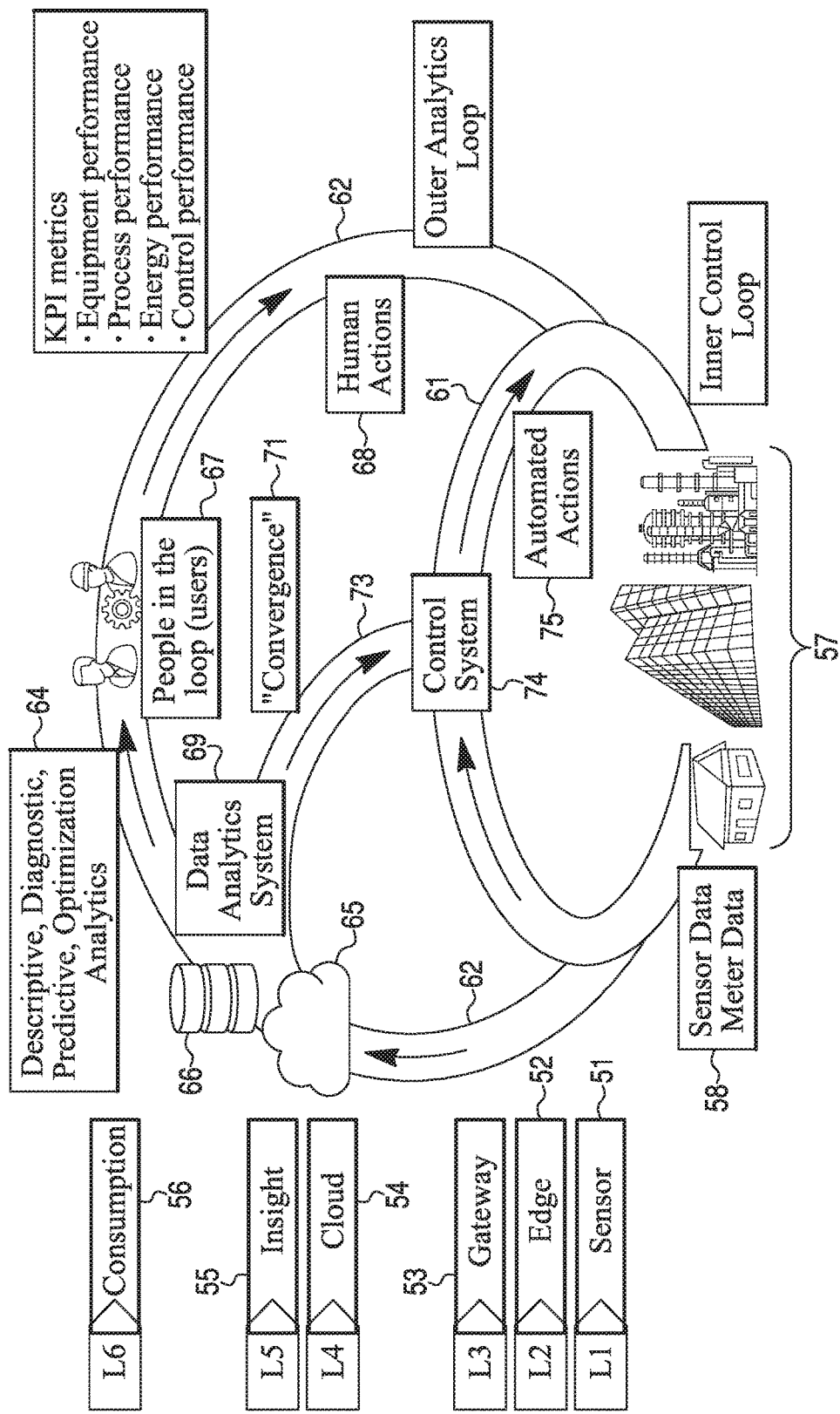
FIG. 4 is a diagram of a high level view of convergence of control and data analytics systems.

FIG. 4 is a diagram of a view revealing a convergence of control and data analytics systems. The convergence may be implemented over six logical levels of IoT framework. Level one 51 may regard a sensor, level two 52 an edge device, level three 53 a gateway, level four 54 a cloud, level five 55 analytics creating insights, and level 56 consumption of analytic insights. Sensor and meter data 58 may be collected from a group 57 of structures and buildings.

An inner control loop 61 may go from group 57 and around back to group 57. An outer loop 62 may go from group 57 and around back to group 57. Outer loop 62 may be an analytics loop. Inner loop 61 may be a control loop. Sensor and meter data 58 may go from group 57 through loops 61 and 62. Data 58 may go to cloud 65 and database 66 subject to descriptive, diagnostic, predictive and optimization analytics 64. People 67, such as users, may be in loop 62 providing human actions 68 in loop 62. Data analytics system 69 may be provided by cloud 65 and database 66. Along with processing at cloud 65 and database 66 resulting in analytics 64, data analytics system 69 may be introduced into a path 73 as a convergence 71 with a control system 74 providing automated actions 75 in inner control loop 61 going to group 57 along with human actions 68 in outer analytics loop 62 to group 57. For example, a residential building/house 57 may be equipped with various automation components, including sensors and meters 58, and also with a connected thermostat that is responsible for a closed-loop control of the indoor temperature. The thermostat is the local control system 74 that generates specific control actions 75 or signals that are communicated to boilers, heaters, or air-conditioning devices installed in the house 57. The data generated by sensors and meters 58 are regularly retrieved and communicated to the cloud environment 65 with the database system 66. Analytics algorithms 64 analyze the historical data stored in database system 66 to create insights into the operation of all devices installed in the house 57. An analytics may reveal that current schedule of the thermostat 74 is defined in an inefficient way that causes energy waste; for instance, there is unnecessary air-conditioning during unoccupied times. Another analytic algorithm 64 may recommend specific adjustment of the schedule that would eliminate that energy waste and this new recommended schedule may be communicated along path 73 to the connected thermostat (control system 74), which will replace its original schedule by the new one and will apply it the A/C equipment deployed in 57 in a form of A/C activation and deactivation commands 75.

Figure 5:
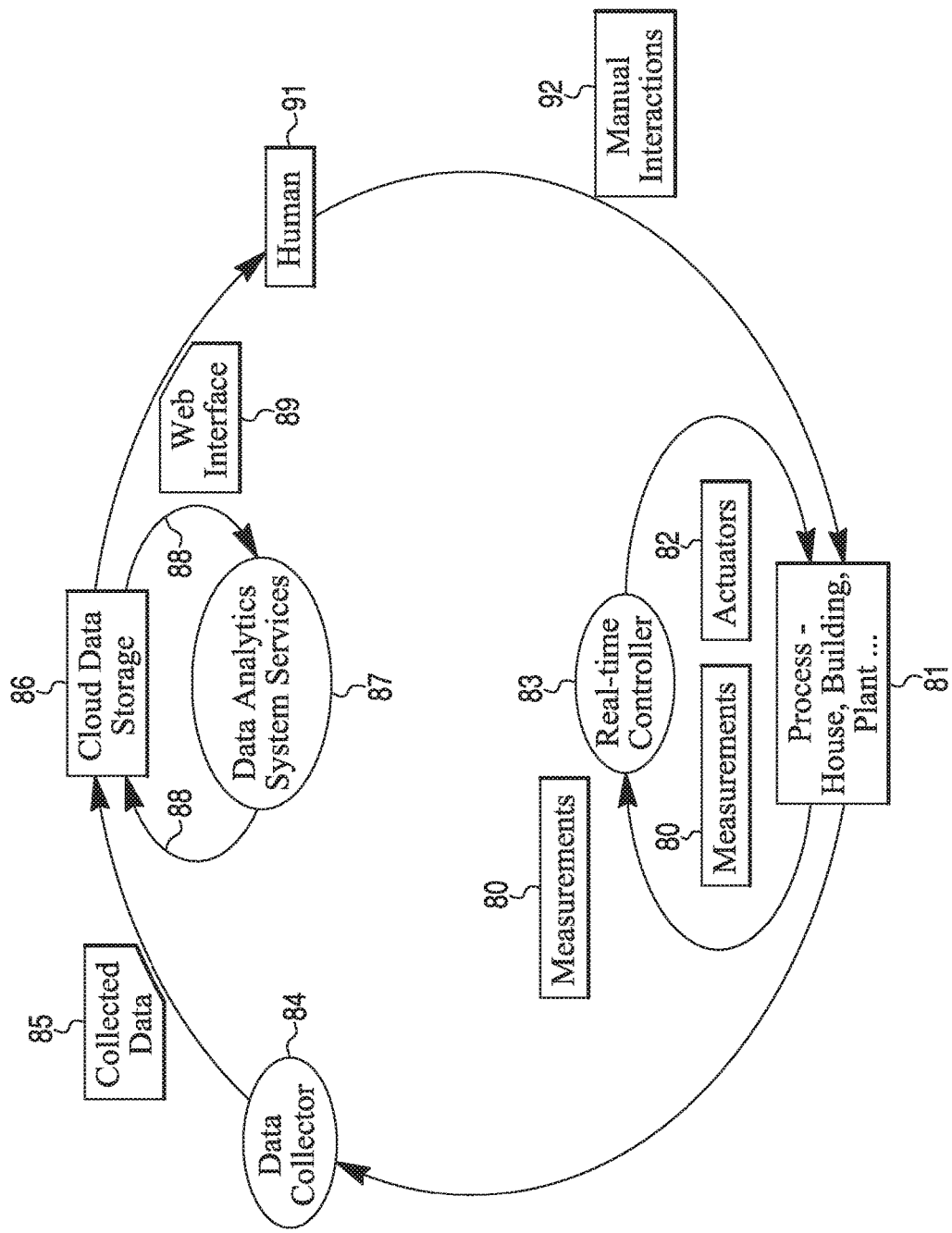
FIG. 5 is a diagram of a current state of control and data analytics systems.

FIG. 5 is a diagram of a current state of the present system of convergence of control and data analytics system. Measurements 80 may proceed from a facility 81 (house, commercial building, industrial plant, and so on) to a real-time controller 83 and a data collector 84. Collected data 85 may go from collector 84 to a cloud data storage 86. A data analytics system services unit 87 may process cloud data 88. A web interface 89 for the cloud data storage 86 may be available to a human 91 who may provide manual interactions 92 to various assets installed in facility 81. Actuator 82 signals may go from real-time controller 83 to the controlled assets that are installed in facility 81.

Figure 6:
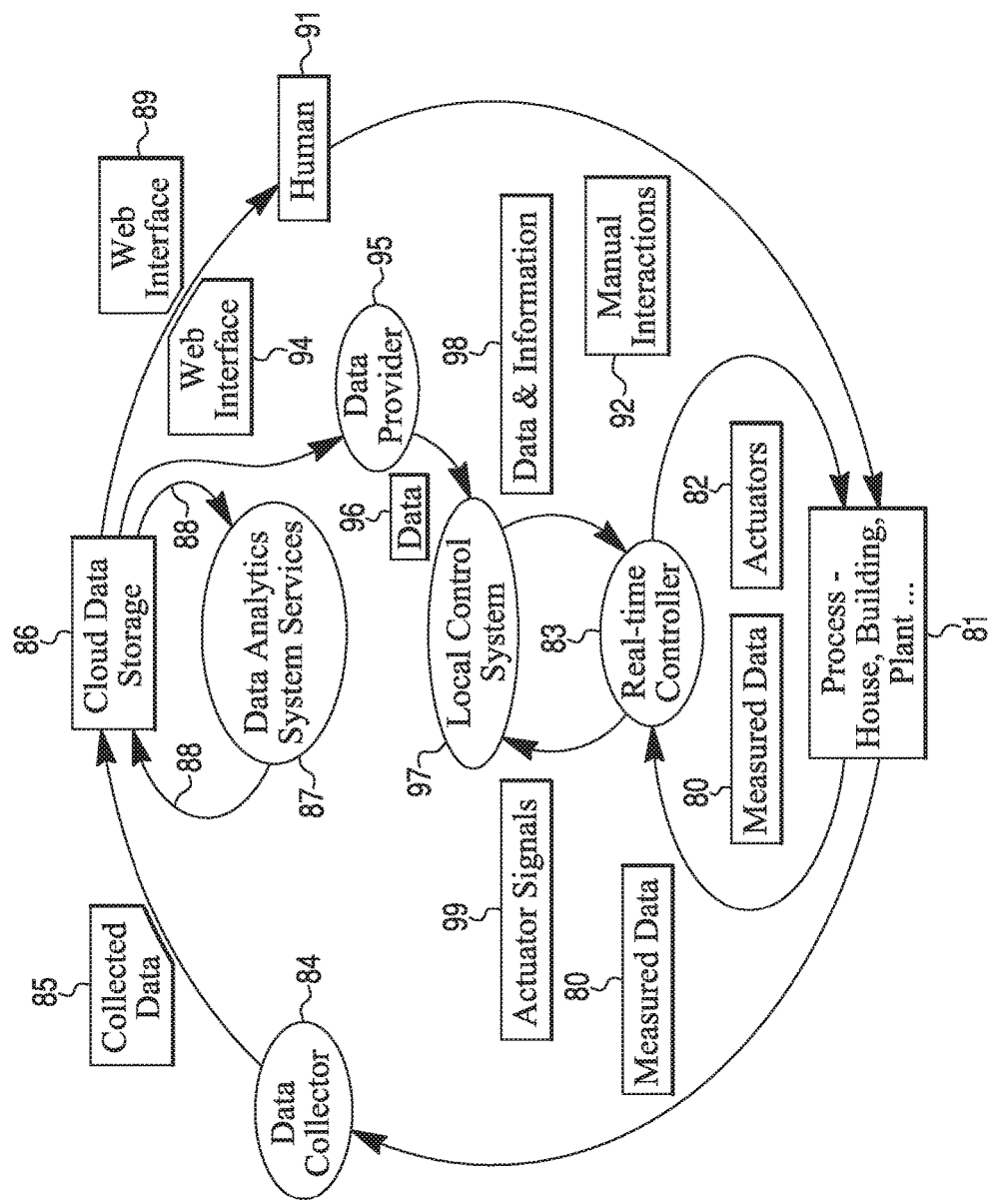
FIG. 6 is a diagram of a convergence state of control and data analytics systems.

FIG. 6 is a diagram showing a convergence of the control and data analytics systems that goes beyond the current state in FIG. 5. Components added for convergence may incorporate a web interface 94 from cloud data storage 86 to a data provider 95 with data 96 from provider 95 to a local control system 97. Information and data 98 may be provided by local control system 97 to real-time controller 83. Actuator control signals 99 may be provided by real time controller 83 to local control system 97.

For example, a residential building/house 81 may be equipped with various automation components, including sensors and meters, which generate measured data 80 and also with a connected thermostat that is responsible for a closed-loop control of the indoor temperature. The thermostat may act as the local control system 97 that generates specific control signals that are communicated to actuation elements 82 of boilers, heaters, or air-conditioning devices installed in the house 81. The measured data 80 may be regularly retrieved by a data collector 84 and uploaded as collected data 85 to the cloud data storage 86. Data analytics system services 87 are applied to analyze the historical data stored in the storage 86 to create insights into the operation of all devices installed in the house 81. An analytics may reveal that current schedule of the thermostat/real time controller 83 is defined in an inefficient way that causes energy waste; for instance, there may be unnecessary air-conditioning during unoccupied times. An analytics system may recommend specific adjustment of the schedule that would eliminate that energy waste and this new recommended schedule may be communicated to the connected thermostat (control system 97) through a data provider 95. The thermostat will replace its original schedule by the new one and will apply it to the A/C equipment deployed in facility (e.g., house) 81 in a form of A/C activation and deactivation commands for actuators 82.

Figure 7:
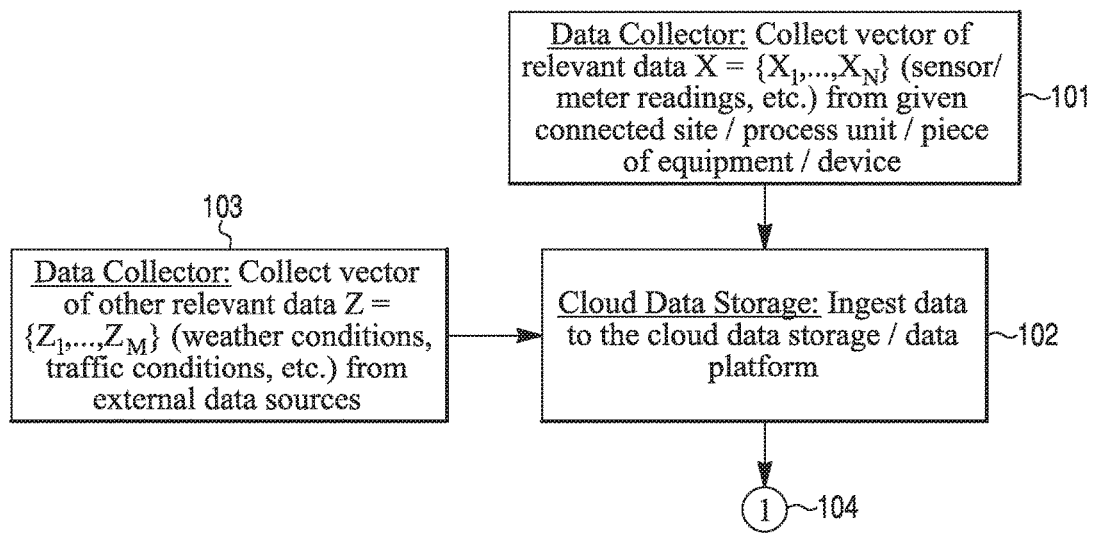
FIG. 7 is a diagram of a common part of a convergence of the control and data analytics systems.
Figure 8:
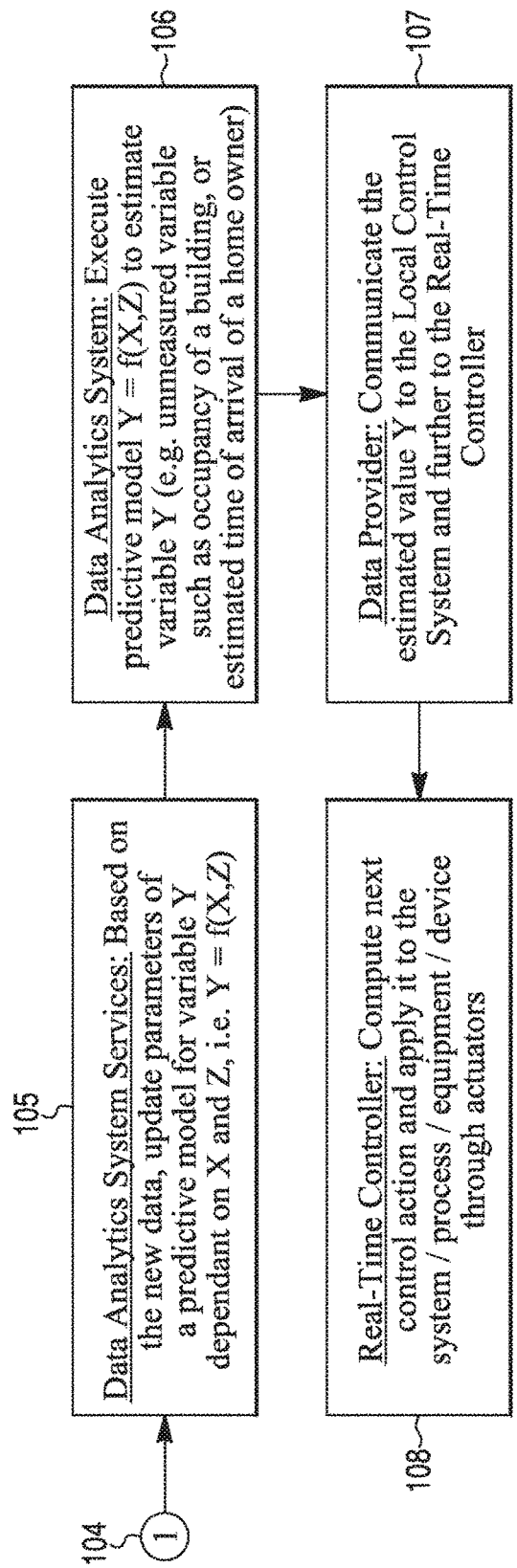
FIG. 8 is a diagram of a first scenario that continues from the diagram of FIG. 7 describing "inferential sensing" use case (use of predicted variable that cannot be directly measured to improve performance of local controller)

FIG. 7 is a diagram of a common part of the present structure or system and approach. In a block 101, data collector 84 of FIG. 6 may collect a vector of relevant data $X=\{X_1, \ldots, X_N\}$ (sensor "I" meter readings, and so on) from a given connected site/process unit/piece of equipment/device. An output of data collector 84 of block 101 may go to cloud data storage 86 of FIG. 6. Data from data collector 84 may be ingested to cloud data storage 86/data platform of a block 102. In a block 103, data collector 84 may collect a vector of other relevant data $Z=\{Z_1, \ldots, Z_M\}$ (weather conditions, traffic conditions, and so on) from external data sources. This data may be also ingested to cloud data storage 86/data platform of block 102. The data ingestion is defined as a process of importing, transferring, loading and processing data for later use or storage in a database, such as the data storage 86. An output 104 from block 102 may be the output of the common part of the present system and approach.

FIGS. 8-11 may reveal continuations of scenarios 1-4, respectively. In scenarios 1 of FIG. 8, output 104 from the common part may go to data analytics system services 87 of a block 105, which may, based on the new data, update parameters of a predictive model for a variable Y dependent on X and Z, that is, $Y=f(X,Z)$. This updating step may involve fitting of a regression model to the recent data and estimation of respective regression model parameters. An output from block 105 may go to a block 106, where data analytics system services 87 executes a predictive model $Y=f(X,Z)$ to estimate variable Y (for example, an unmeasured variable such as occupancy of a building, or an estimated time of arrival of a home owner).

An output from block 106 may go to a block 107, where data provider 95 may communicate the estimate value Y to local control system 97 and further to real-time controller 83. An output from block 107 may go to a block 108, where real-time controller 83 may compute a next control action and apply it to the system/process/equipment/device 81 through actuators 92. Such a next control action may be computation of a new supply air temperature set-point of an air handling unit, or computation of new set-point for variable frequency drives (VFD) of the same air handling unit.

Figure 9:
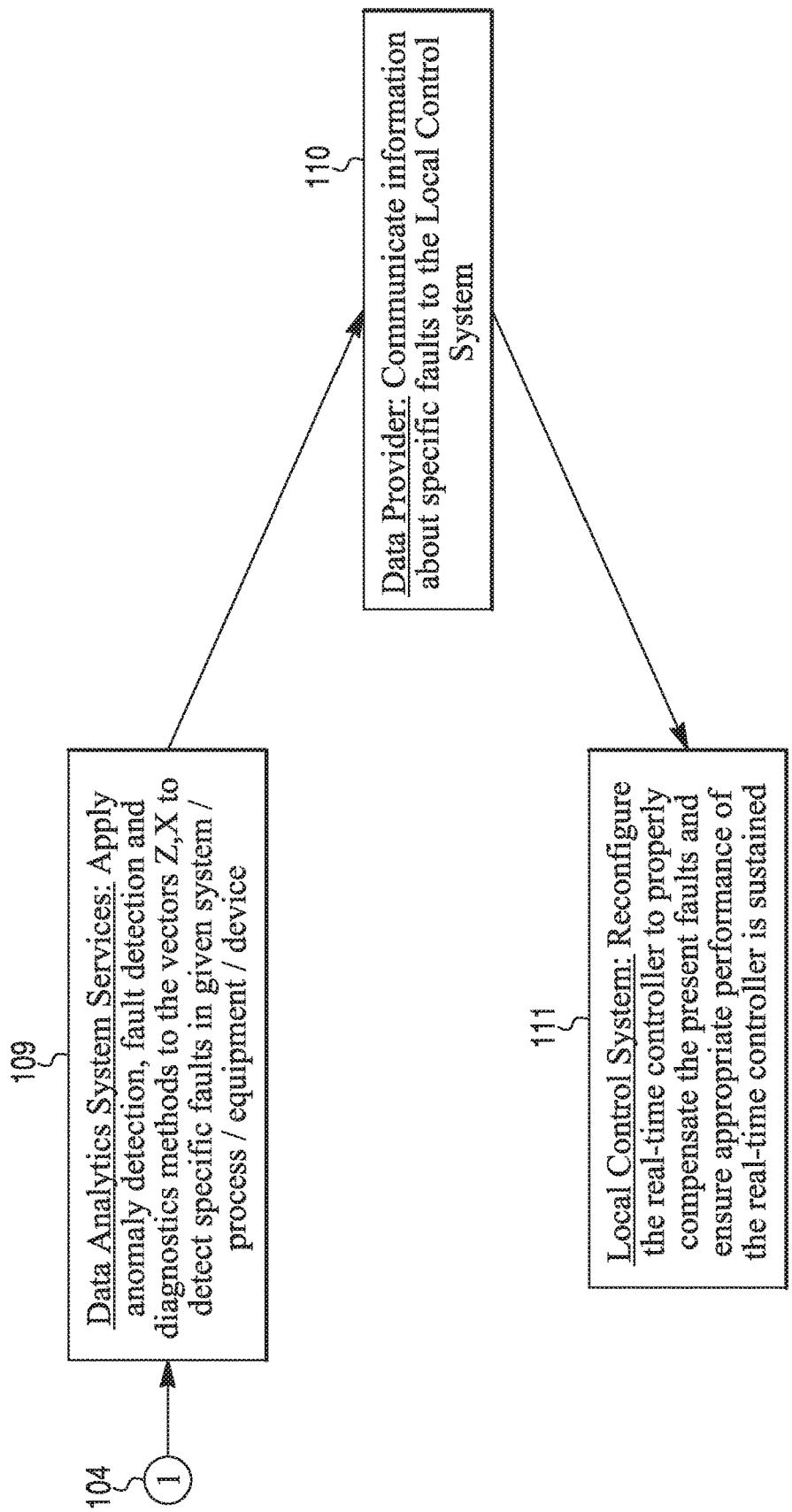
FIG. 9 is a diagram of a second scenario that continues from the diagram of FIG. 7 describing "fault detection" use case (use of information about the fault to improve performance of local controller)

In scenario 2 of FIG. 9, output 104 from the common part may go to data analytics system services 87 of block 109. Data analytics system services 87 may apply anomaly detection, fault detection and diagnostics approaches to vectors Z, X to detect specific faults in a given system/process/equipment/device. For instance, outdoor temperature Z1 and humidity Z2 can be two items of vector Z that is received from an external weather provider. Vector X may include three items: indoor temperature X1, temperature set-point X2, and run-time of air-conditioning equipment X3. The anomaly detection service may be the looking for particular situations when temperature set-point X2 is not met, that is, the indoor temperature X1 significantly deviates from this set-point. These situations may be correlated with variables Z1, Z2 and X3. An output from block 109 may go to a block 110, where data provider 95 may communicate information about specific faults to local control system 97. An output from block 110 may go to a block 111, where local control system 97 may reconfigure real-time controller 83 to properly compensate the present faults and ensure that appropriate performance of real-time controller 83 is sustained.

Figure 10:
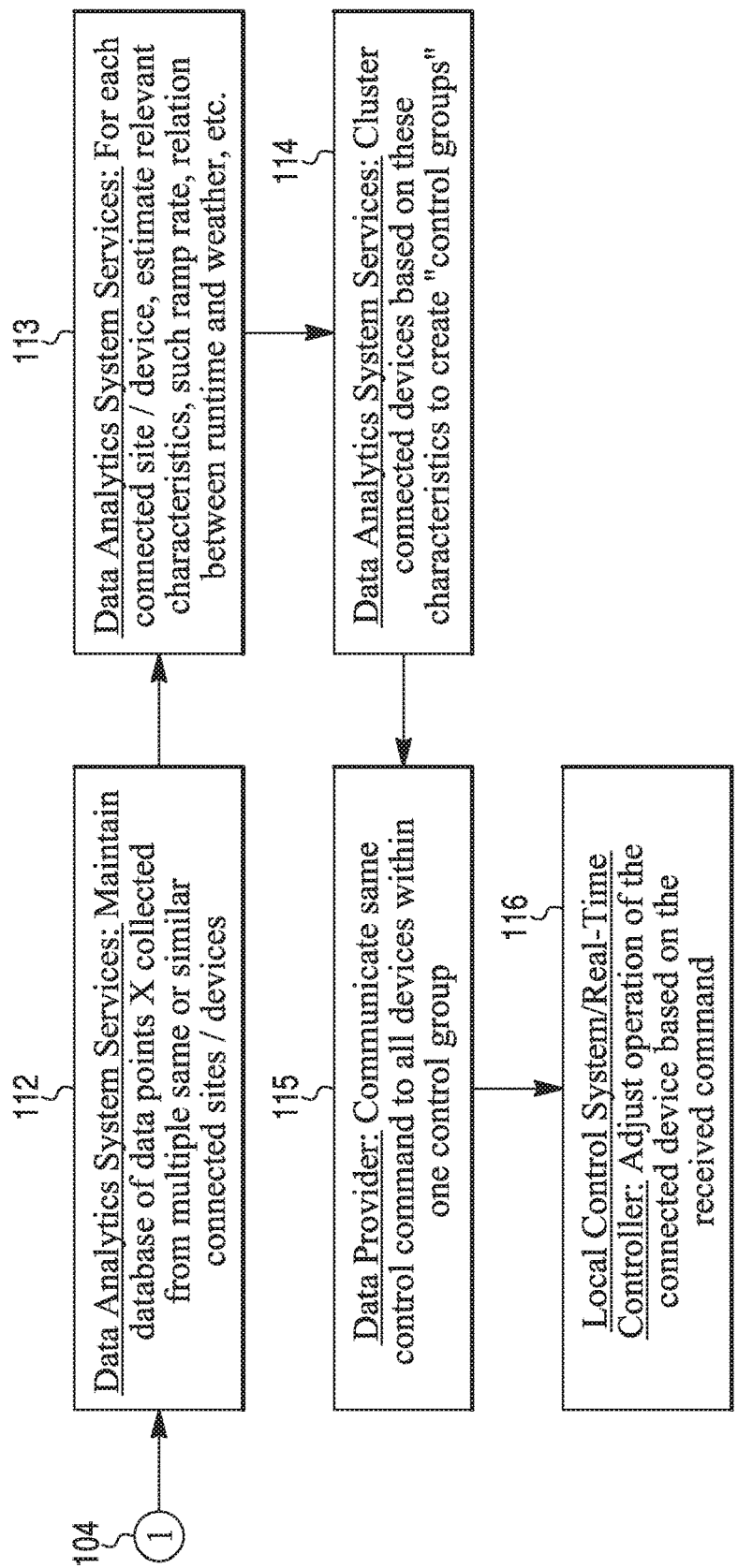
FIG. 10 is a diagram of a third scenario that continues from the diagram of FIG. 7 describing "demand response" use case (use of the learned characteristics of connected devices to group them appropriately and adjust their operation during a demand response event)

In scenario 3 of FIG. 10, output 104 from the common part may go to data analytics system services 87 of block 112. Data analytics system services 87 may maintain a database of data points X collected from multiple same or similar connected sites/devices. These connected sites may include residential buildings/homes with connected thermostats (devices). The other category could be commercial buildings with connected HVAC controllers. An output from block 112 may go to data analytics system services 87 of block 113, where for each connected site/device, data system services 87 may estimate relevant characteristics, such as ramp rate, relationship between runtime on weather, and so on. An output from block 113 may go to data analytics system services 87, of a block 114, where cluster connected devices are based on these relevant characteristics to create "control groups". An output form block 114 may go to a data provider 95 of a block 115. Data provider 95 may communicate a same control command to all devices within one control group. An output from block 115 may go to local control system 97/real-time controller 83 of a block 116 to adjust an operation of a connected device based on a received command.

Figure 11:
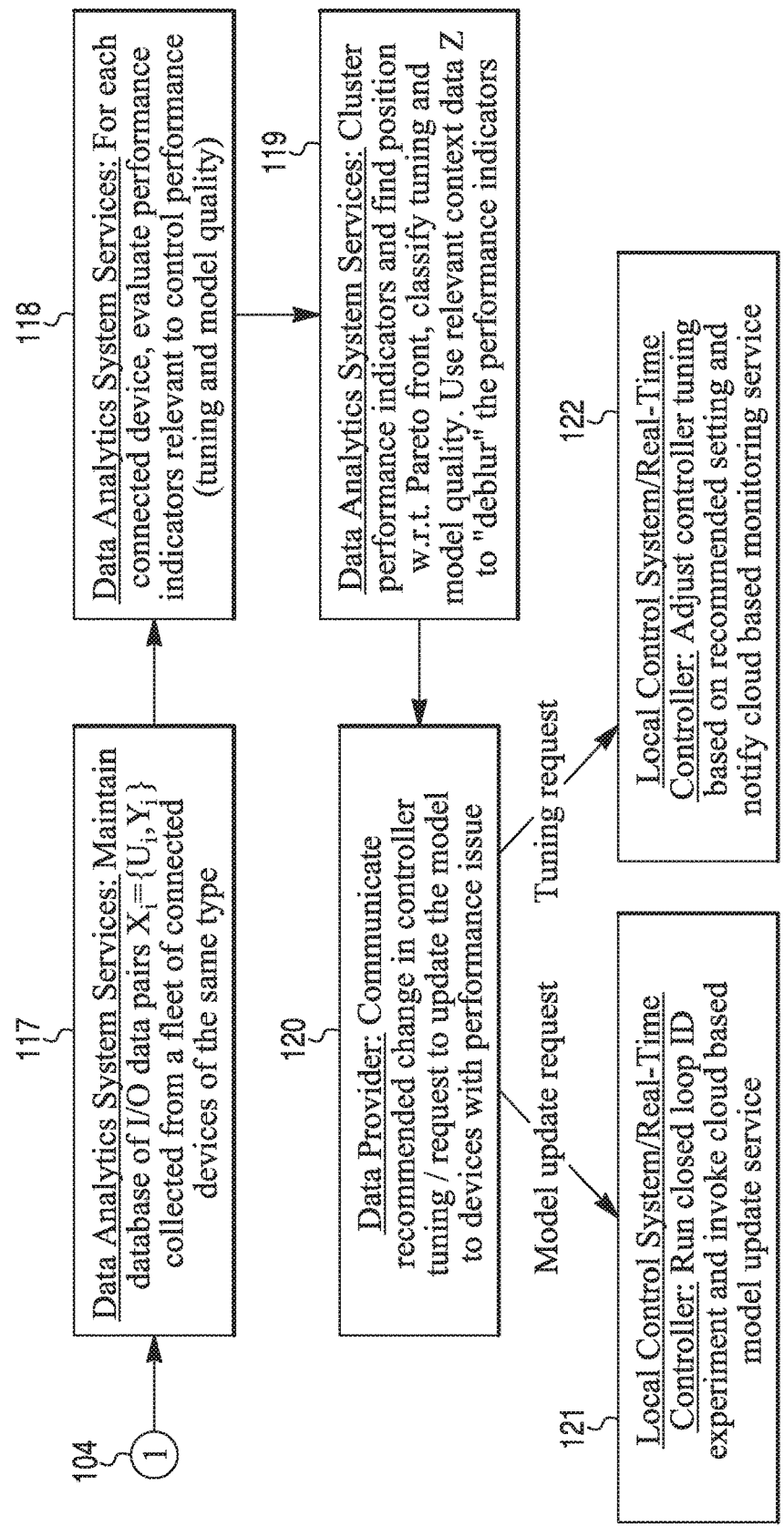
FIG. 11 is a diagram of a fourth scenario that continues from the diagram of FIG. 7 describing "fleet wide" performance monitoring use case (use of information about the fleet performance to update the tuning or model of local controllers).

In scenario 4 of FIG. 11 that can involve controller performance monitoring, output 104 from the common part may go to data analytics system services 87 that maintains a database of I/O data pairs $X_i=\{U_i, Y_1\}$ collected from a fleet of connected devices of the same type. An output of block 117 may go to data analytics system services 87 of a block 118. Data analytics system services 87 may, for each connected device, evaluate performance indicators relevant to control performance, which are tuning and model quality.

An output from block 118 may go to data analytics system services 87 of a block 119, where cluster performance indicators and find position w.r.t. Pareto front, classify tuning and model quality. Relevant context data Z may be used to "deblur" the performance indicators. From block 119 an output may go to a data provider 95 of a block 120, to communicate a recommended change in controller tuning/request to update the model to devices with a performance issue.

An output from block 120 may go to a block 121 with a model update request. Local control system 97/real-time controller 83 may run a closed loop ID experiment and invoke a cloud based model update service.

The output from block 120 may go to a block 122 with a tuning request. Local control system 97/real-time controller 83 may adjust controller tuning based on a recommended setting and notify the cloud based monitoring service.

FIGS. 8-11 are continuations of scenarios 1-4, respectively. In scenarios 1 of FIG. 8, output 104 from the common part may go to data analytics system services 87 of a block 105, which may, based on the new data, update parameters of a predictive model for a variable Y dependent on X and Z, that is, Y=f(X,Z). An output from block 105 may go to a block 106, where data analytics system services 87 execute a predictive model Y=f(X,Z) to estimate variable Y (for example, an unmeasured variable such as occupancy of a building, or an estimated time of arrival of a home owner).

An output from block 106 may go to a block 107, where data provider 95 may communicate the estimate value Y to local control system 97 and further to real-time controller 83. An output from block 107 may go to a block 108, where real-time controller 83 may compute a next control action and apply it to the system/process/equipment/device 81 through actuators 92.

In scenario 2 of FIG. 9, output 104 from the common part may go to data analytics system services 87 of block 109. Data analytics system services 87 may apply anomaly detection, fault detection and diagnostics approaches to vectors Z, X to detect specific faults in a given system/process/equipment/device. An output from block 109 may go to a block 110, where data provider 95 may communicate information about specific faults to local control system 97. An output from block 110 may go to a block 111, where local control system 97 may reconfigure real-time controller 83 to properly compensate the present faults and ensure that appropriate performance of real-time controller 83 is sustained.

In scenario 3 of FIG. 10, output 104 from the common part may go to data analytics system services 87 of block 112. Data analytics system services 87 may maintain a database of data points X collected from multiple same or similar connected sites/devices. An output from block 112 may go to data analytics system services 87 of block 113, where for each connected site/device, data analytics system services 87 may estimate relevant characteristics, such as ramp rate, relationship between runtime on weather, and so on. An output from block 113 may go to data analytics system services 87, of a block 114, where cluster connected devices are based on these relevant characteristics to create "control groups". An output form block 114 may go to a data provider 95 of a block 115. Data provider 95 may communicate a same control command to all devices within one control group. An output from block 115 may go to local control system 97/real-time controller 83 of a block 116 to adjust an operation of a connected device based on a received command.

In scenario 4 of FIG. 11 that can involve controller performance monitoring, output 104 from the common part may go to data analytics system services 87 that maintains a database of I/O data pairs $X_i=\{U_i, Y_i\}$ collected from a fleet of connected devices of the same type. An output of block 117 may go to data analytics system services 87 of a block 118. Data analytics system services 87 may, for each connected device, evaluate performance indicators relevant to control performance, which are tuning and model quality.

An output form block 118 may go to data analytics system services 87 of a block 119, where cluster performance indicators and find position w.r.t. Pareto front, classify tuning and model quality. Relevant context date Z may be used to "deblur" the performance indicators. From block 119 an output may go to a data provider 95 of a block 120, to communicate a recommended change in controller tuning/request to update the model to devices with a performance issue.

An output form block 120 may go to a block 121 with a model update request. Local control system 97/real-time controller 83 may run a closed loop ID experiment and invoke a cloud based model update service.

The output from block 120 may go to a block 122 with a tuning request. Local control system 97/real-time controller 83 may adjust controller tuning based on a recommended setting and notify the cloud based monitoring service.

To recap, a system based on convergence of analytics and control, may incorporate an outer loop and an inner loop. The outer loop may have a data analytics system. The inner loop may have a control system that modifies its settings based on analyzed data from the data analytics system of the outer loop.

The outer loop may be an analytics loop. The inner loop may be a control loop. A flow of the data from the outer loop to the inner loop may improve performance of the control loop based on the data analytics system. The outer loop may follow a path that has one or more items from a group having sensor data, meter data, a database, a cloud, users, metrics, analytics, and user actions. The inner loop may follow a path that has one or more items from a group having facilities, sensor data, meter data, and automated actions.

The analytics may be descriptive, diagnostic, predictive, or prescriptive. The metrics may be of performance of equipment, process, energy, or control.

A convergence structure may incorporate a control system having input-output models, a data analytics system that analyzes data for creating insights, and a structure that converges the control system and the data analytics system.

The control system may use sensor and meter data to implement input-output models to achieve values of one or more parameters. The data for the data analytics system may be from a plurality of sources.

The structure that converges the control system and the data analytics system, may use the insights to close a loop between the insights and on-premise controls of the input-output models.

The analytics of the data analytics system may receive and analyze data from hundreds of homes, buildings, installations, refineries, and process plants.

A convergence mechanism may incorporate a first data collector, a second data collector, a data storage module connected to the first data collector and the second data collector, and a first data analytics system services module connected to the data storage module. The first data collector may incorporate one or more sensors and meters that provide data from a structure, connected site, process unit, piece of equipment, or device. The second data collector may incorporate connections to sources that provide data external to the structure, connected site, process unit, piece of equipment, or device. The data storage module may incorporate memory hardware connected to the first data collector and the second data collector.

The mechanism may further incorporate a second data analytics system services module connected to the first data analytics system services module, a data provider connected to the second data analytics system services module, a local control system connected to the data provider, and a real-time controller connected to the data provider and the local control system.

The first data analytics system services module, based on data, may update parameters of a predictive model for a first variable dependent on one or more other variables. The second data analytics system services module may execute the predictive model to estimate the first variable. The data provider may communicate an estimate of the first variable from the second data analytics system services model. The data provider may communicate the estimate of the first variable to the local control system and to the real-time controller. The real-time controller may compute and apply a control action to the structure, connected site, process unit, piece of equipment, or device, through one or more actuators.

The mechanism may further incorporate a data provider connected to the first data analytics system services module, and a local control system connected to the data provider.

The mechanism may further incorporate a real-time controller. The data provider may communicate information about specific faults to the local control system. The local control system may reconfigure the real-time controller to compensate the specific faults and ensure sustaining performance of the real-time controller.

The mechanism may further incorporate a second data analytics system services module connected to the first data analytics system services module, a third data analytics system services module connected to the second data analytics system services module, a data provider connected to the third data analytics system services module, a local control system connected to the data provider, and a real-time controller connected to the local control system.

The first data analytics system services module may maintain a database of data points collected from multiple same or similar connected sites or devices. The second analytics system services may estimate relevant characteristics for each connected site or device. The third data analytics system services module may cluster connected devices based on the relevant characteristics to create control groups. The data provider may communicate a control command to devices within one control group. The local control system or the real-time controller may adjust operation of a connected device based on a received command.

The mechanism may further incorporate a second data analytics system services module connected to the first data analytics system services module, a third data analytics system services module connected to the second data analytics system services module, a data provider connected to the third data analytics system services module, a local control system connected to the data provider, and a real-time controller connected to the local control system.

The first data analytics system services module may maintain a database of input/output (I/O) data pairs collected from a fleet of connected devices of the same type. The second data analytics system services module may evaluate performance indicators to control performance for each connected device of the fleet of connected devices. The third data analytics system services module may cluster the performance indicators to classify tuning and model quality. The data provider may communicate a request to update a model to devices with a performance issue. The local control system or the real-time controller may run a closed loop identification (ID) experiment and invoke a cloud based model update service.

The first data analytics system services module may maintain a database of input-output (I/O) data pairs collected from a fleet of connected devices of the same type. The second data analytics system services module may evaluate performance indicators to control performance for each connected device of the fleet of connected devices. The third data analytics system services module may cluster the performance indicators to classify tuning and model quality. The data provider may communicate a request to change tuning of the controller. The local control system or the real-time controller may adjust controller tuning based on a recommended setting and invoke a cloud based monitoring service.

Any publication or patent document noted herein is hereby incorporated by reference to the same extent as if each publication or patent document was specifically and individually indicated to be incorporated by reference.

In the present specification, some of the matter may be of a hypothetical or prophetic nature although stated in another manner or tense.

Although the present system and/or approach has been described with respect to at least one illustrative example, many variations and modifications will become apparent to those skilled in the art upon reading the specification. It is therefore the intention that the appended claims be interpreted as broadly as possible in view of the related art to include all such variations and modifications.

What is claimed is:

1. A convergence mechanism comprising:
a first data collector;
a second data collector;
a data storage module connected to the first data collector and the second data collector; and
one or more data analytics system services modules connected to the data storage module; and
wherein:
the first data collector comprises one or more sensors and meters that provide data from a structure, connected site, process unit, piece of equipment, or device;
the second data collector comprises connections to sources that provide data external to the structure, connected site, process unit, piece of equipment, or device; and
the data storage module comprises memory hardware connected to the first data collector and the second data collector,
the convergence mechanism further comprising:
a data provider connected to the one or more analytics system services modules;
a local control system connected to the data provider; and
a real-time controller connected to the local control system,
wherein:
the one or more data analytics system services modules:
maintain a database of data points collected from multiple same or similar connected sites or devices;
estimate relevant characteristics for each connected site or device; and
cluster connected devices based on the relevant characteristics to create control groups;
the data provider communicates a control command to devices within one control group; and
the local control system or the real-time controller adjusts operation of a connected device based on a received command,
wherein the one or more analytics system services module:
based on data, update parameters of a predictive model for a first variable dependent on one or more other variables; and
execute the predictive model to estimate the first variable,
wherein:
the data provider communicates an estimate of the first variable from the one or more data analytics system services module
the data provider communicates the estimate of the first variable to the local control system and to the real-time controller; and the real-time controller computes and applies a control action to the structure, connected site, process unit, piece of equipment, or device, through one or more actuators.

2. The mechanism of claim 1, wherein the real-time controller is connected to the data provider and the local control system.

3. The mechanism of claim 1, wherein:
the data provider communicates information about specific faults to the local control system; and
the local control system reconfigures the real-time controller to compensate the specific faults and ensure sustaining performance of the real-time controller.

4. The mechanism of claim 1, wherein:
the one or more data analytics system services module maintain a database of input/output (I/O) data pairs collected from a fleet of connected devices of the same type;
the one or more data analytics system services modules evaluate performance indicators to control performance for each connected device of the fleet of connected devices;
the one or more data analytics system services modules cluster the performance indicators to classify tuning and model quality;
the data provider communicates a request to update a model to devices with a performance issue; and
the local control system or the real-time controller runs a closed loop identification (ID) experiment and invokes a cloud based model update service.

5. The mechanism of claim 1, wherein:
the one or more data analytics system services module maintain a database of input-output (I/O) data pairs collected from a fleet of connected devices of the same type;
the one or more data analytics system services modules evaluate performance indicators to control performance for each connected device of the fleet of connected devices;
the one or more data analytics system services modules cluster the performance indicators to classify tuning and model quality;
the data provider communicates a request to change tuning of the controller; and
the local control system or the real-time controller adjusts controller tuning based on a recommended setting and invokes a cloud based monitoring service.

6. A convergence mechanism comprising:
a first data collector;
a second data collector;
a data storage module connected to the first data collector and the second data collector; and
one or more data analytics system services modules connected to the data storage module; and
wherein:
the first data collector comprises one or more sensors and meters that provide data from a structure, connected site, process unit, piece of equipment, or device;
the second data collector comprises connections to sources that provide data external to the structure, connected site, process unit, piece of equipment, or device; and
the data storage module comprises memory hardware connected to the first data collector and the second data collector,
the convergence mechanism further comprising:
a data provider connected to the one or more analytics system services modules;
a local control system connected to the data provider; and
a real-time controller connected to the local control system,
wherein:
the one or more data analytics system services modules:
maintain a database of data points collected from multiple same or similar connected sites or devices;
estimate relevant characteristics for each connected site or device; and
cluster connected devices based on the relevant characteristics to create control groups;
the data provider communicates a control command to devices within one control group; and
the local control system or the real-time controller adjusts operation of a connected device based on a received command,
wherein:
the one or more data analytics system services module maintain a database of input/output (I/O) data pairs collected from a fleet of connected devices of the same type;
the one or more data analytics system services modules evaluate performance indicators to control performance for each connected device of the fleet of connected devices;
the one or more data analytics system services modules cluster the performance indicators to classify tuning and model quality;
the data provider communicates a request to update a model to devices with a performance issue; and
the local control system or the real-time controller runs a closed loop identification (ID) experiment and invokes a cloud based model update service.

* * * * *